UNITED STATES PATENT OFFICE.

JAN FREDERIK DEN OUDEN, OF HEUVELLAAN, NETHERLANDS, ASSIGNOR TO NAAMLOOZE VENNOOTSCHAP TOT EXPLOITATIE DER VERF HEUSIET, OF AMSTERDAM, NETHERLANDS, A CORPORATION ACCORDING TO DUTCH LAW.

MANUFACTURE OF AN ANTIFOULING PAINT.

No. 891,724.    Specification of Letters Patent.    Patented June 23, 1908.

Application filed August 27, 1907. Serial No. 390,388.

*To all whom it may concern:*

Be it known that I, JAN FREDERIK DEN OUDEN, lieutenant, subject of the Queen of the Netherlands, and residing at Hilversum 46, Heuvellaan, Netherlands, have invented certain new and useful Improvements in the Manufacture of an Antifouling Paint, of which the following is a specification.

This invention relates to a manufacture of an antifouling paint for wood, iron and the like, which protects the painted surface from the destructive influence of sea water and eliminates or hinders the injurious action of pile worms, sea-weed, mussels and the like. The new paint consists essentially of a mixture of coal tar, shell lime, white arsenic, boracite and borax, in suitable proportions. After the surface to be painted has been cleaned, the paint is applied thereto.

The mixture consists of 70–85 parts, of coal tar, 10–20 parts of pure shell lime, 1 part of white arsenic, 2–4 parts of boracite and 2–4 parts of borax. The first three constituents are the preservative proper, the arsenic serving to prevent attachment of sea growth until the paint has acquired the right degree of hardness; the admixture of boracite and borax is for the purpose of hardening the paint, so as to prevent adhesion of mussels and other growth and penetration by pile worms.

In making the paint, the burnt powdered lime (that is to say, pure shell lime) is intimately mixed with white arsenic, boracite (the mineral consisting essentially of magnesium borate and magnesium chlorid $Mg_7B_{16}O_{30}Cl_2$) and borax ($Na_2B_4O_7$), both the latter being powdered. The coal tar is then gradually added, the mixture being continuously stirred to prevent formation of lumps. It is recommended to warm the liquid before use in winter to about 15°C.; in the summer and in the tropics this is not generally necessary.

Instead of pure shell lime, lime from limestone may be used, but a good paint is only obtained when the lime is as pure as possible, that is to say free from impurities left by the burning operation.

After the surface to be painted,—for example, a ship's bottom or quay piles,—has been completely cleaned, the paint is uniformly applied to the surface, and allowed to dry slowly and thoroughly. After this first coat the work is repeated, the second coat of paint having the same composition as the first, but without the shell lime.

If ships, boats, pontoons, submerged parts of bridges and the like, are coated with the new paint, penetration of pile worms and injurious growth of sea plants and sea animals are no longer to be feared, since the boracite in combination with the borax under the action of sea water makes the paint as hard as stone.

Having now particularly described and ascertained the nature of my said invention and in what manner the same is to be performed, I declare that what I claim is:

1. An antifouling paint consisting of an intimate mixture containing coal tar, lime, white arsenic, boracite and borax.

2. An antifouling paint, consisting of an intimate mixture containing about eighty parts of coal tar, about twenty parts of pure shell lime, one part of white arsenic, about four parts of boracite and about four parts of borax, substantially as described.

3. An antifouling paint consisting of an intimate mixture containing coal tar, white arsenic, boracite, and borax, substantially as described.

In testimony whereof I have hereunto set my hand in presence of two subscribing witnesses.

JAN FREDERIK DEN OUDEN.

Witnesses:
 THOMAS HERMANN VERHAVE,
 ANTONIO ELBERTS DOOEN.